M. C. FRINS.
CHANGE SPEED GEARING.
APPLICATION FILED OCT. 1, 1919.

1,409,289.

Patented Mar. 14, 1922.

WITNESS

INVENTOR

ATTORNEYS

UNITED STATES PATENT OFFICE.

MAXIMILIAN C. FRINS, OF NEW YORK, N. Y., ASSIGNOR TO INTERNATIONAL MOTOR COMPANY, OF NEW YORK, N. Y., A CORPORATION OF DELAWARE.

CHANGE-SPEED GEARING.

1,409,289.  Specification of Letters Patent.  Patented Mar. 14, 1922.

Application filed October 1, 1919. Serial No. 327,718.

*To all whom it may concern:*

Be it known that I, MAXIMILIAN C. FRINS, a citizen of the United States, residing in the borough of Manhattan, of the city of New York, in the State of New York, have invented certain new and useful Improvements in Change-Speed Gearing, of which the following is a specification, reference being had to the accompanying drawing, forming a part hereof.

This invention relates to change speed gearing and is concerned particularly with a construction in which four speeds and reverse are employed. Ordinarily, in change speed gearing, several of the pairs of gears for the different speeds remain constantly in mesh and the reverse idler gear usually remains in mesh with one of the two gears with which it is engaged for effecting the reverse drive. Further, in a gear set for accomplishing four speeds forward and reverse, at least four shifter forks are required for moving the gears selectively into the various combinations. The principal object of the present invention is to provide a change speed gearing in which only three shifter forks are required for effecting four direct speeds and reverse drive. A further object of the invention is to provide a construction in which the reverse idler normally remains out of mesh with all of the other gears and yet may be slid axially on its supporting shaft into mesh with the gears on the main and counter shafts for effecting the reverse drive. Still another object of the invention is to eliminate from the gear set the constant mesh of the several pairs of gears whereby the different speeds are derived. Still another object of the invention is to reduce materially the length of the gear faces thereby facilitating their cutting.

In accordance with the invention separate shifter forks are operatively engaged with two of the sliding gears, respectively, for accomplishing the shifting of such gears for varying combinations of direct speeds, while a single fork is operatively engaged with a reverse idler gear and with the low speed sliding gear so that movement of this fork in one direction will mesh the gears for low speed and movement of the fork in the opposite direction will mesh the reverse idler with its co-operating gears for reverse. The invention will be described in detail in connection with the accompanying drawing in which there is illustrated, by way of example, a gear set in which the improvements are incorporated. In the drawing—

Figure 1:
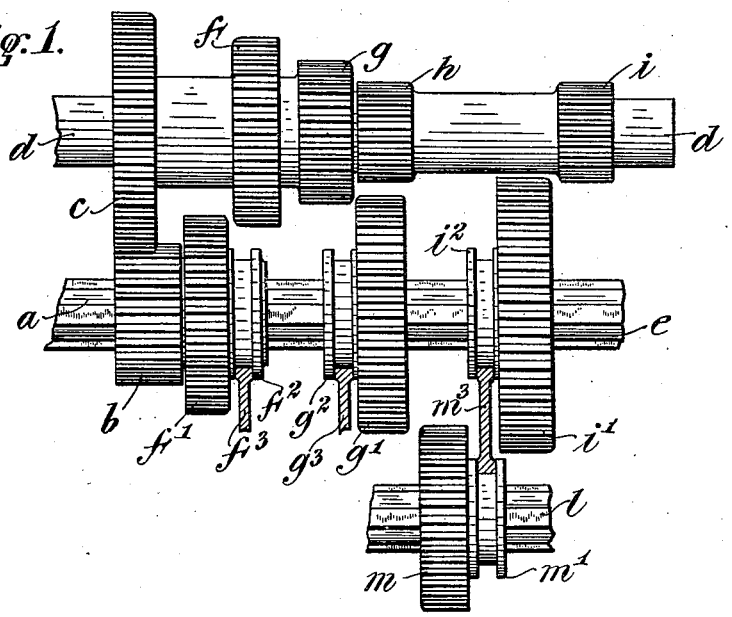
Figure 1 is a conventional illustration of a gear set for four speeds and reverse showing the main shaft with the slidable gears splined thereon, the counter shaft with the gears fixed thereon and the reverse idler with its shaft brought into a plane with the other shafts in the interest of clearness.
Figure 2:
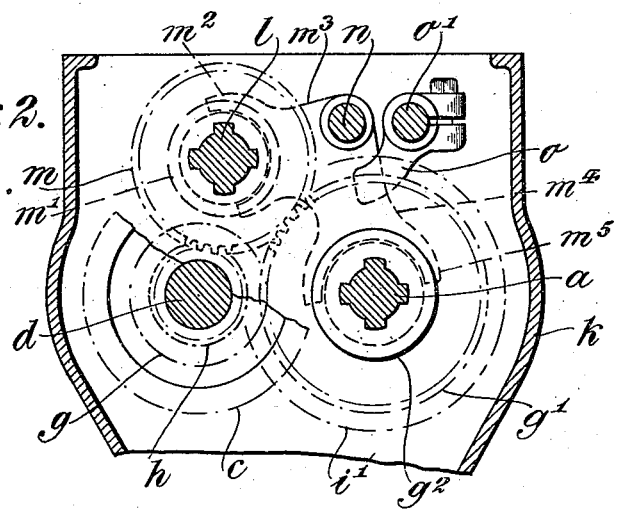
Figure 2 is a view in transverse section through a gear casing in which the gears shown in Figure 1 are mounted, the reverse idler gear and the reverse speed gear being shown in end elevation.

The showing in Figure 1 is intended to be somewhat diagrammatic since it will be understood, as the description proceeds, that the features of the invention may be realized in gear sets having a different arrangement of gears from that shown in said figure. For purposes of this description, however, it may be supposed that the drive shaft $a$ has fixed thereon a master gear $b$ with which meshes constantly a gear $c$ fixed on the counter shaft $d$. The main shaft $e$, may, as usual, have one end journaled within the master gear $b$, this construction forming no part of the present invention. On the counter shaft $d$ may be fixed a series of gears of different pitch diameters, the third speed gear being indicated at $f$, the second speed gear being indicated at $g$, the reverse gear being indicated at $h$ and the low speed gear being indicated at $i$. With these gears cooperate slidable gears splined on the main shaft $e$, the third speed gear being indicated at $f'$, the second speed and the reverse gear being indicated at $g'$ and the low speed gear being indicated at $i'$. The third speed gear $f'$ may be provided with an internal gear, as usual, by which this gear may be engaged with the master gear $b$ for direct drive, that is, high speed. On the face of the third speed gear $f'$ is carried a collar $f^2$ with which engages the yoke of a shifter fork indicated in section at $f^3$. On the face of the second speed gear $g'$ is carried a collar $g^2$ with which engages the yoke of a shifter fork indicated in section at $g^3$. The shifting of these gears $f'$, $g'$, through their respective forks $f^3$, $g^3$ may be accomplished in any known manner, as will be understood. In the gear casing $k$ is supported a shaft $l$ on which is slidably splined a reverse idler $m$. On the face of this idler gear $m$ is carried a collar $m'$ with which engages a yoke $m^2$ of a shifter fork $m^3$. This shifter fork is supported slidably on a shaft $n$ which is also carried in the gear casing $k$. Integral with the arm $m^3$ of this shifter fork is an arm $m^4$ of a second fork $m^5$ which engages a collar $i^2$ carried on the face of the low speed gear $i'$. The fork $m^3$, as well as the other forks $f^3$, $g^3$ of the gears $f'$, $g'$, may be picked up for selective speed changing by an arm $o$ which is carried on a slidable rod $o'$ supported in the gear casing $k$ and actuated by the shifting lever in a manner which is commonly practised.

The relation of the parts described is such that when the gears are in neutral position no two of them are in mesh with the exception of the constant mesh gears $b$, $c$, as is obviously necessary.

The indirect speeds are effected selectively by bringing one of the gears $i'$, $g'$, $f'$, in mesh successively with their co-operating gears $i$, $g$, $f$, on the counter shaft $d$, through the medium of the respective forks $m^4$, $g^3$, $f^3$. High speed or direct drive is finally accomplished by shifting the internal gear of the gear $f'$ into mesh with the master gear $b$, through the medium of the shifting fork $f^3$. When the low speed gear $i'$ is slid into mesh with the co-operating gear $i$ on the counter shaft $d$, it will be evident that by the improved construction the idler gear $m$ is slid along its shaft $l$ but away from the other gears so that there is no interference and the gear $m$ remains idle. When reverse speed is desired the gear $m$ is slid through the fork $m^3$ into mesh with the gear $h$ on the counter shaft $d$ and the gear $g'$ on the main shaft $e$. During this shifting, since the arm $m^4$ is integral with the arm $m^3$, the low speed gear $i'$ is also slid along its shaft but away from its co-operating gear $i$ on the counter shaft $d$.

A feature of the invention resides in the construction of the reverse gear $h$ on the counter shaft $d$ with a face of such length as to permit its teeth to engage the teeth of the reverse idler $m$ before this idler gear engages the gear $g'$ on the main shaft $e$. By reason of this construction, the reverse idler $m$ does not engage the two co-operating gears $h$, $g'$ simultaneously but rather successively.

Figure 3:
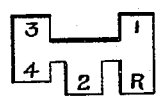
Figure 3 is a diagrammatic view of one form of gate which may be used with the shifting lever to accomplish the gear changes.

Referring now to Figure 3 the practical utility of the improved gear set considered in one of its phases can be understood. In the design of the gear set it is proposed that the pitch diameters of the co-operating gears shall be such as to make it sufficient ordinarily for only three speeds to be employed, it being contemplated that the lowest speed ordinarily used be second speed. The shifts into third and fourth speeds will then be made successively. Accordingly, a gate for the shifting lever of much the form shown in Figure 3 may be employed and with this type of gate the shifting lever may be moved readily from one position into another in much the manner ordinarily employed with only three speeds. The driver would ordinarily move his lever into position "2", giving the starting speed and then shift forward into position "3" and thence straight back into position "4". These three speeds will have been effected by actuation of only the two yokes $g^3$, $f^3$. In any case where low speed is desired the lever will be moved into position "1" when the arm $o$ will pick up the fork $m^3$ and thereby permit actuation of the low speed gear $i'$ into mesh with the low speed gear $i$ on the counter shaft $d$. The same initial position of the lever $i$ will, of course, place the parts in position for actuation of the reverse idler $m$ since the arms $m^3$, $m^4$ are integral and to all intents and purposes constitute a single shifter arm. The positions of the lever are, of course, such that while the reverse and low speed gears may ordinarily be held in locked position, there can be no danger of meshing more than two of the gears of the set and thereby locking the gears.

The elements necessary in combination to put into effect the principle of the invention by which the improved results are secured will be set out in the appended claim.

I claim as my invention:

In change speed gearing, in combination with the main shaft and counter shaft, co-operating gears on said shafts, the gears of one of said shafts being slidable into mesh with the co-operating gears on the other of said shafts but normally out of mesh therewith, respectively, for selective control of the speeds, a reverse idler gear normally held out of mesh with the other of said gears, a shaft on which said idler gear is splined, and a single shifted fork engaging said reverse idler gear and also one of the forward speed gears to permit sliding movement of the reverse idler gear in one direction into mesh with the co-operating gears on the main shaft and counter shaft and at the same time sliding movement of said last named forward speed gear in the other direction into mesh with its co-operating gear on the counter shaft.

This specification signed this 25" day of September, A. D. 1919.

MAXIMILIAN C. FRINS.